(12) United States Patent
Brauer et al.

(10) Patent No.: US 11,120,546 B2
(45) Date of Patent: Sep. 14, 2021

(54) UNSUPERVISED LEARNING-BASED REFERENCE SELECTION FOR ENHANCED DEFECT INSPECTION SENSITIVITY

(71) Applicant: KLA Corporation, Milpitas, CA (US)

(72) Inventors: Bjorn Brauer, Beaverton, OR (US); Nurmohammed Patwary, San Jose, CA (US); Sangbong Park, Milpitas, CA (US); Xiaochun Li, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/013,264

(22) Filed: Sep. 4, 2020

(65) Prior Publication Data

US 2021/0090229 A1 Mar. 25, 2021

Related U.S. Application Data

(60) Provisional application No. 63/021,694, filed on May 8, 2020, provisional application No. 62/904,855, filed on Sep. 24, 2019.

(51) Int. Cl.
*G06K 9/00* (2006.01)
*G06T 7/00* (2017.01)
*G06K 9/62* (2006.01)
*G06T 5/00* (2006.01)
*G06T 5/50* (2006.01)

(52) U.S. Cl.
CPC ............ *G06T 7/001* (2013.01); *G06K 9/6219* (2013.01); *G06K 9/6223* (2013.01);
(Continued)

(58) Field of Classification Search
CPC ........... G06T 7/001; G06T 5/002; G06T 5/50; G06T 2207/30148; G06T 2207/20224;
(Continued)

(56) References Cited

U.S. PATENT DOCUMENTS 6,456,899 B1 * 9/2002 Gleason ........... G05B 19/41875
700/212
9,401,014 B2 * 7/2016 Zafar ................... G06T 7/0006
(Continued)

FOREIGN PATENT DOCUMENTS

KR  20170091716 A  8/2017
KR  20190029484 A  3/2019
WO  2014074893 A1  5/2014

OTHER PUBLICATIONS

PCT International Search Report and Written Opinion for International Application No. PCT/US2020/051343 dated Dec. 30, 2020, 7 pages.

*Primary Examiner* — Samir A Ahmed
(74) *Attorney, Agent, or Firm* — Suiter Swantz pc llo

(57) ABSTRACT

An optical characterization system and a method of using the same are disclosed. The system comprises a controller configured to be communicatively coupled with one or more detectors configured to receive illumination from a sample and generate image data. One or more processors may be configured to receive images of dies on the sample, calculate dissimilarity values for all combinations of the images, perform a cluster analysis to partition the combinations of the images into two or more clusters, generate a reference image for a cluster of the two or more clusters using two or more of the combinations of the images in the cluster; and detect one or more defects on the sample by comparing a test image in the cluster to the reference image for the cluster.

27 Claims, 10 Drawing Sheets

(52) U.S. Cl.
CPC ............ *G06K 9/6259* (2013.01); *G06T 5/002* (2013.01); *G06T 5/50* (2013.01); *G06T 2207/20224* (2013.01); *G06T 2207/30148* (2013.01)

(58) Field of Classification Search
CPC ....... G06T 7/0006; G06T 7/12; G06T 7/0014; G06T 2207/30168; G06K 9/6259; G06K 9/6219; G06K 9/6223
See application file for complete search history.

(56) References Cited

U.S. PATENT DOCUMENTS

| | | | |
|---|---|---|---|
| 10,151,706 B1 | 12/2018 | Bhattacharyya et al. | |
| 10,395,358 B2 | 8/2019 | Brauer et al. | |
| 10,698,325 B2 | 6/2020 | Brauer | |
| 2007/0156379 A1* | 7/2007 | Kulkarni | G06F 30/30 703/14 |
| 2007/0230770 A1* | 10/2007 | Kulkarni | H01L 21/67005 382/149 |
| 2007/0288219 A1* | 12/2007 | Zafar | G06T 7/0008 703/14 |
| 2008/0144023 A1* | 6/2008 | Shibata | G01N 21/95623 356/237.2 |
| 2008/0304734 A1 | 12/2008 | Young et al. | |
| 2009/0324057 A1 | 12/2009 | Silberstein et al. | |
| 2015/0154746 A1* | 6/2015 | Zafar | G06T 7/0006 382/149 |
| 2017/0192411 A1* | 7/2017 | Ghadar | G05B 19/41875 |
| 2020/0126830 A1 | 4/2020 | Dowling et al. | |
| 2020/0265574 A1 | 8/2020 | Brauer | |

\* cited by examiner

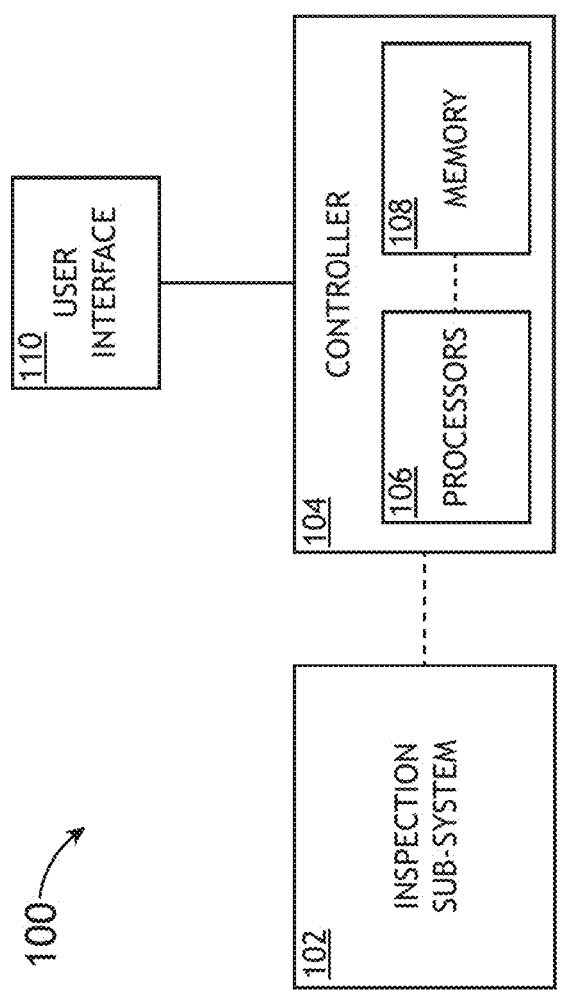

UNSUPERVISED LEARNING-BASED REFERENCE SELECTION FOR ENHANCED DEFECT INSPECTION SENSITIVITY

CROSS-REFERENCE TO RELATED APPLICATION

The present application claims the benefit under 35 U.S.C. § 119(e) of U.S. Provisional Application Ser. No. 62/904,855 filed Sep. 24, 2019, entitled UNSUPERVISED LEARNING-BASED REFERENCE SELECTION FOR ENHANCED DEFECT INSPECTION SENSITIVITY, naming Bjorn Brauer and Nurmohammed Patwary as inventors, which is incorporated herein by reference in the entirety.

The present application claims the benefit under 35 U.S.C. § 119(e) of U.S. Provisional Application Ser. No. 63/021,694 filed May 8, 2020, entitled SYSTEMS AND METHODS TO ENHANCE DEFECT INSPECTION SENSITIVITY BY IMPROVED REFERENCE COMPUTATION, naming Bjorn Brauer, Nurmohammed Patwary, Sangbong Park, and Xiaochun Li as inventors, which is incorporated herein by reference in the entirety.

TECHNICAL FIELD

The present disclosure generally relates to the detection of defects in semiconductor wafers and masks. In particular, the present disclosure relates to finding a suitable reference image to compare to a test image (e.g., to find the differences between the reference image and the test image).

BACKGROUND

To detect defects on a sample (e.g., a semiconductor wafer or photomask), an illumination source illuminates the sample and a detector (e.g., a camera) receives illumination that is reflected or scattered from the sample. The detector generates image data, and the image data is then transmitted to a computer system.

To detect the defects, a test image (i.e., a test frame) is compared to a reference image (i.e., reference frame). The reference image serves as an ideal or error-free image such that when the test image is subtracted from the reference image, the difference image indicates a problematic structure, and a corrective action is performed (e.g., by altering the design or processing of a wafer). It is desirable to improve the generation of reference images to accurately detect defects on a wafer (e.g., by removing undesirable noise).

SUMMARY

An optical characterization system is disclosed in accordance with one or more illustrative embodiments of the present disclosure. In one illustrative embodiment, the optical characterization system comprises a controller configured to be communicatively coupled with one or more detectors configured to receive illumination from a sample and generate image data. The controller includes one or more processors configured to execute program instructions causing the one or more processors to: receive the image data, wherein the image data comprises images of dies on the sample; calculate dissimilarity values for all combinations of the images; perform a cluster analysis to partition the combinations of the images into two or more clusters; generate a reference image for a cluster of the two or more clusters using two or more of the combinations of the images in the cluster; and detect one or more defects on the sample by comparing a test image in the cluster to the reference image for the cluster.

An optical characterization method is disclosed in accordance with one or more illustrative embodiments of the present disclosure. In one illustrative embodiment, the optical characterization method comprises: receiving illumination from a sample using one or more detectors; generating image data; receiving the image data, wherein the image data comprises images of dies on the sample; calculating dissimilarity values for all combinations of the images; performing a cluster analysis to partition the combinations of the images into two or more clusters; generating a reference image for a cluster of the two or more clusters using two or more of the combinations of the images in the cluster; and detecting one or more defects on the sample by comparing a test image in the cluster to the reference image for the cluster.

An optical characterization system is disclosed in accordance with one or more illustrative embodiments of the present disclosure. In one illustrative embodiment, the optical characterization system comprises a controller configured to be communicatively coupled with one or more detectors configured to receive illumination from a sample and generate image data. The controller includes one or more processors configured to execute program instructions causing the one or more processors to: receive the image data, wherein the image data comprises images of dies on the sample; identify edge die images from the images of dies on the sample; generate a reference edge die image using a first edge die image from the edge die images; calculate dissimilarity values for all combinations of the reference die image and others of the edge die images; perform a cluster analysis to partition the combinations of the images into two or more clusters; generate a reference image for a cluster of the two or more clusters using two or more of the combinations of the images in the cluster; and detect one or more defects on the sample by comparing a test image in the cluster to the reference image for the cluster.

An optical characterization system is disclosed in accordance with one or more illustrative embodiments of the present disclosure. In one illustrative embodiment, the optical characterization system comprises a controller configured to be communicatively coupled with one or more detectors configured to receive illumination from a sample and generate image data. The controller includes one or more processors configured to execute program instructions causing the one or more processors to: receive the image data, wherein the image data comprises images of dies on the sample; identify a test image; calculate dissimilarity values for all combinations of the test image and the others of the images; identify two or more of the combinations having a dissimilarity value below a threshold dissimilarity value; generate a reference image using the two or more of the combinations; and detect one or more defects on the sample by comparing the reference image to the test image.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 1 is a box diagram illustrating an optical characterization system for collecting an image of a sample, in accordance with one or more embodiments of the present disclosure.

DETAILED DESCRIPTION OF THE INVENTION

Figure 2A:
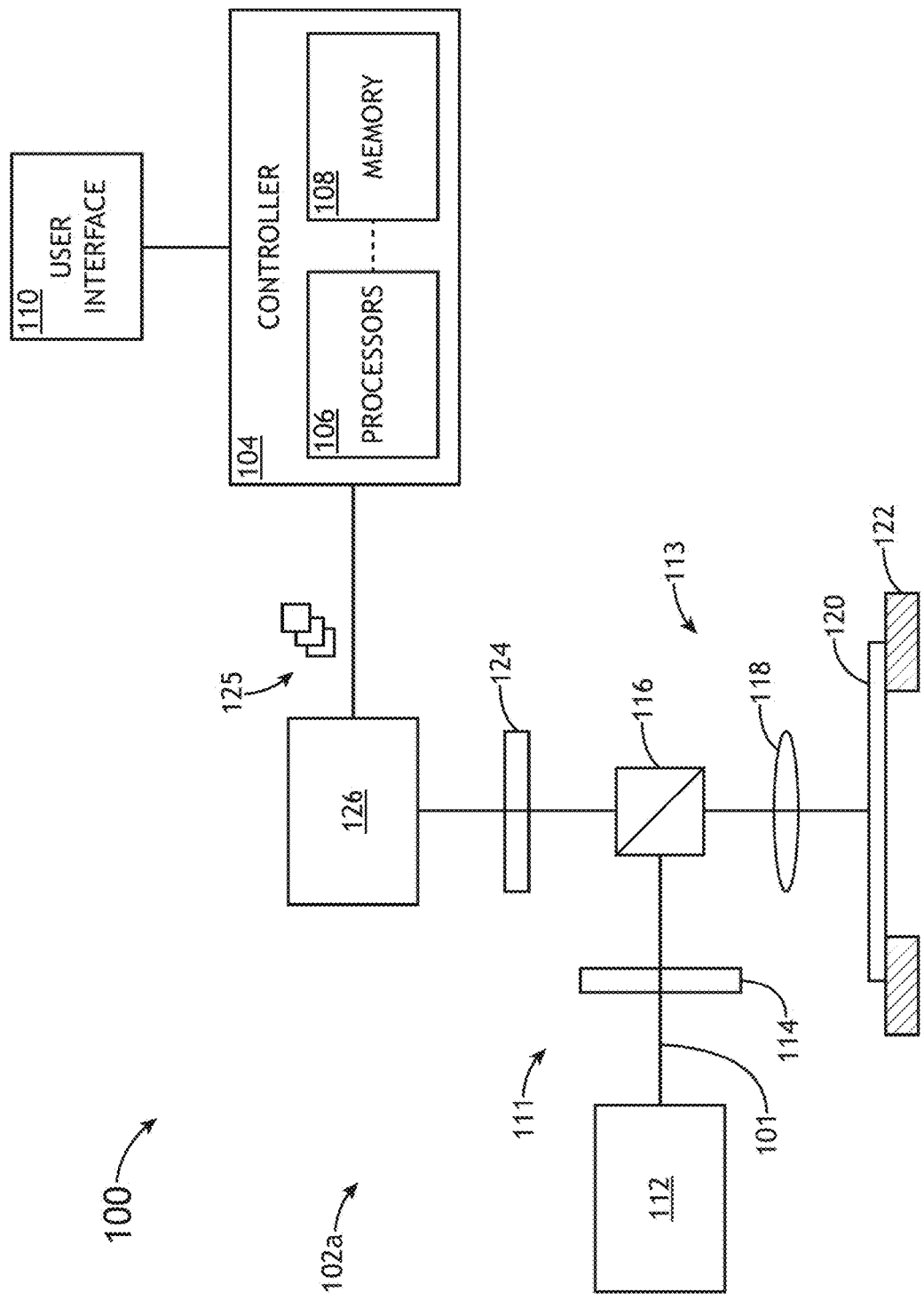
FIG. 2A illustrates the optical characterization system of FIG. 1 including an optical-based inspection subsystem, in accordance with one or more embodiments of the present disclosure.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

It is noted herein that the terms "frame" and "image" may be construed as being interchangeable. Additionally, the terms "test image," "candidate image," and "target image" may be construed as interchangeable. Additionally, the terms "computed," "calculated," and "generated" may be construed as interchangeable.

Embodiments of the present disclosure are directed to an optical characterization system, and a method of using the same. The optical characterization system may be configured to detect one or more defects on a sample (e.g., a semiconductor wafer or a photomask), or to detect a misalignment (e.g., overlay) between layers of a sample. The system may entail illuminating the sample with photons or electrons, and receiving illumination (e.g., photons or electrons reflected and/or scattered from the sample) at one or more detectors to generate image data.

The image data may be transmitted to a controller (e.g., an image server). The image data may comprise a plurality of images (i.e., frames), where each image corresponds to a die on a wafer. The images may be aligned (e.g., overlaid onto each other) and corrected for die-to-die process variation, and all the dies on the wafer may be compared to create a wafer map. The wafer map may then be used to identify the dies most similar to each other and to generate a reference image. The reference image may be compared to a candidate image (i.e., a test image) for a die to be tested. When the reference image is subtracted from the candidate image, the difference may indicate a problematic structure or a misalignment, and a corrective action may be performed (e.g., by altering the design or processing of a wafer). Embodiments of the present disclosure enable the identification of images of dies which are similar to each other, and the calculation of a reference image using the most similar images.

In a conventional system, a test image of an individual die on a wafer is compared to a reference image of either an individual die or a linear combination of die images (e.g., an average of die images). Only the images from adjacent dies are used to calculate the difference image between the test image and the reference image.

Using images of adjacent dies for reference image generation assumes that the process (e.g., the lithographic processing) is similar for the adjacent dies. However, this process similarity is not always present. For example, when considering the row of dies in the center of a wafer, the dies next to each other occur at different radial locations. A first die may be at a radius of 5 mm from the center, a second die may be at a radius of 10 mm, and a third die may be at a radius of 15 mm, etc. Since many wafer processing conditions have a radial dependency, the first die and the second die may be considered different (as well as the first die and the third die, etc). This radial dependency is especially apparent when comparing dies close to the edge of the wafer to dies in the inner part of the wafer.

Thus, in a conventional system, images of dies located next to each other (e.g., in a horizontal row) are compared to each other. The dies that are located next to each other are not necessarily the most similar to each other, and thus, noise from the radial dependency of the processing may prevent the accurate detection of differences between the dies.

For example, in a conventional system, an image of 3-12 dies from the same swath (i.e., same die row) may be collected. Then, frames within the image are compared. For example, the reference image is generated from a linear combination of the other frames (e.g., averaged). This process does not guarantee that the best possible frame combinations are used to generate the reference image. Therefore, in many cases, artifacts may be present in the difference image (e.g., noise from the radial dependency of the wafer processing).

In general, semiconductor manufacturers tend not to focus on slight variations in the radial profile of the wafers, since the variations are inherent to the processing tools and are not yield limiting. Rather, the manufacturers desire the highest possible detection sensitivity to key defects of interest. However, this sensitivity cannot be guaranteed if there is underlying process variation noise when comparing image frames. Only when this process variation noise is minimized can the defect detection sensitivity be enhanced.

There are several methods to generate an optimized reference image for the identification of defects on a wafer. Such methods include, for example: (a) double detection using neighboring dies as reference, (b) calculation of a median image using up to 12 dies within the same die row close to the candidate image (Multi-Die Adaptive Threshold [MDAT]), (c) computing a reference image by minimizing the sum squared difference between the reference image and the candidate image (Multi-Die Computed Reference Adaptive Threshold [MCAT]), (d) averaging a variety of images on the wafer (single reference die [SRD]), or (e) calculating a reference image from design. MCAT is a recent development and is a significant improvement over MDAT. However, there is room for improvement when the noise characteristic of the test die is significantly different from all the reference dies. Selecting only reference images from adjacent frames within the same die row limits to further improvements in MCAT sensitivity.

To overcome this issue, embodiments of the present disclosure are directed to a flexible unsupervised learning-based reference image selection algorithm. The unsupervised learning-based algorithm may find the reference images that are most similar to the test image throughout the entire wafer, and may then use the similar reference images for a reference image calculation (e.g., an MCAT reference calculation).

FIG. 1 illustrates an optical characterization system 100, in accordance with one or more embodiments of the present disclosure. In particular, FIG. 1 illustrates a system 100 for determining defects on a surface of a sample (e.g., a semiconductor wafer, photomask, or reticle). The system 100 may include, but is not limited to, one or more characterization subsystems 102 (i.e., an inspection subsystem 102). The system 100 may additionally include a controller 104 including one or more processors 106 and a memory 108, and a user interface 110.

The characterization subsystem 102 may include any characterization subsystem 102 known in the art including, but not limited to, an inspection subsystem (e.g., configured to detect defects in a sample). In some embodiments, the characterization subsystem 102 may be an overlay metrology subsystem (e.g., configured to measure overlay or alignment in a sample). The characterization subsystem 102 may include, but is not limited to, an optical-based inspection system, a charged particle-based inspection system, and the like. For instance, the characterization subsystem 102 may include a broadband inspection system (e.g., broadband plasma inspection system) or a narrowband inspection system (e.g., laser-based inspection system). In another instance, the characterization subsystem 102 may include a scanning electron microscopy (SEM) inspection system.

In one embodiment, the controller 104 is communicatively coupled to the one or more characterization subsystems 102. The one or more processors 106 of the controller 104 may be configured to generate one or more control signals configured to adjust one or more characteristics of the inspection subsystem 102. For example, the controller 104 may be configured to adjust the height of a stage holding a sample or a wavelength of light.

In one embodiment, the controller 104 is configured to receive one or more images (e.g., image data) of a sample. For example, the image data may comprise a plurality of images (i.e., frames). Each of the frames may correspond to a die on a sample (e.g., if the sample is a wafer). The controller 104 may be configured to determine one or more features of the sample indicative of one or more defects of the sample. In another embodiment, the controller 104 may be configured to receive one or more target images of one or more target features of a target sample.

FIG. 2A illustrates a simplified schematic view of the system 100 for characterizing a sample, in accordance with one or more embodiments of the present disclosure. In particular, the system 100 as depicted in FIG. 2A includes an optical inspection subsystem 102 such that system 100 operates as an optical inspection system.

The optical inspection subsystem 102a may include any optical-based inspection known in the art. For example, the inspection subsystem 102a may include an optical dark-field inspection tool. The optical inspection subsystem 102a may include, but is not limited to, an illumination source 112, an illumination arm 111, a collection arm 113, and a detector assembly 126.

In one embodiment, optical inspection subsystem 102a is configured to inspect and/or measure the sample 120 disposed on the stage assembly 122. The illumination source 112 may include any illumination source known in the art for generating illumination 101 including, but not limited to, a broadband radiation source. In another embodiment, optical inspection subsystem 102a may include an illumination arm 111 configured to direct illumination 101 to the sample 120. It is noted that illumination source 112 of the optical inspection subsystem 102a may be configured in any orientation known in the art including, but not limited to, a dark-field orientation, a light-field orientation, etc. For example, one or more optical elements 114, 124 may be selectably adjusted in order to configure the inspection subsystem 102a in a dark-field orientation, a bright-field orientation, etc.

The sample 120 may include any sample known in the art including, but not limited to, a wafer, a reticle, a photomask, etc. In one embodiment, the sample 120 is disposed on a stage assembly 122 to facilitate movement of the sample 120. In another embodiment, the stage assembly 122 is an actuatable stage. For example, the stage assembly 122 may include, but is not limited to, one or more translational stages suitable for selectably translating the sample 120 along one or more linear directions (e.g., x-direction, y-direction and/or z-direction). By way of another example, the stage assembly 122 may include, but is not limited to, one or more rotational stages suitable for selectively rotating the sample 120 along a rotational direction. By way of another example, the stage assembly 122 may include, but is not limited to, a rotational stage and a translational stage suitable for selectably translating the sample 120 along a linear direction and/or rotating the sample 120 along a rotational direction. It is noted herein that the system 100 may operate in any scanning mode known in the art.

The illumination arm 111 may include any number and type of optical components known in the art. In one embodiment, the illumination arm 111 includes one or more optical elements 114, a beam splitter 116, and an objective lens 118. In this regard, illumination arm 111 may be configured to focus illumination 101 from the illumination source 112 onto the surface of the sample 120. The one or more optical elements 114 may include any optical elements known in the art including, but not limited to, one or more mirrors, one or more lenses, one or more polarizers, one or more beam splitters, wave plates, one or more apodizers, and the like.

In another embodiment, optical inspection subsystem 102a includes a collection arm 113 configured to collect illumination reflected or scattered from sample 120. In another embodiment, collection arm 113 may direct and/or focus the reflected and scattered light to one or more sensors of a detector assembly 126 via one or more optical elements 124. The one or more optical elements 124 may include any optical elements known in the art including, but not limited to, one or more mirrors, one or more lenses, one or more polarizers, one or more beam splitters, wave plates, and the like. It is noted that detector assembly 126 may include any sensor and detector assembly known in the art for detecting illumination reflected or scattered from the sample 120.

In another embodiment, the detector assembly 126 of the optical inspection subsystem 102 is configured to collect inspection data of the sample 120 based on illumination reflected or scattered from the sample 120. In another embodiment, the detector assembly 126 is configured to transmit collected/acquired images and/or metrology data to the controller 104.

As noted previously herein, the controller 104 of system 100 may include one or more processors 106 and a memory 108. The memory 108 may include program instructions configured to cause the one or more processors 106 to perform various steps of the present disclosure. In one embodiment, the program instructions are configured to cause the one or more processors 106 to adjust one or more characteristics of the optical inspection subsystem 102a in order to perform one or more measurements of the sample 120.

Figure 2B:
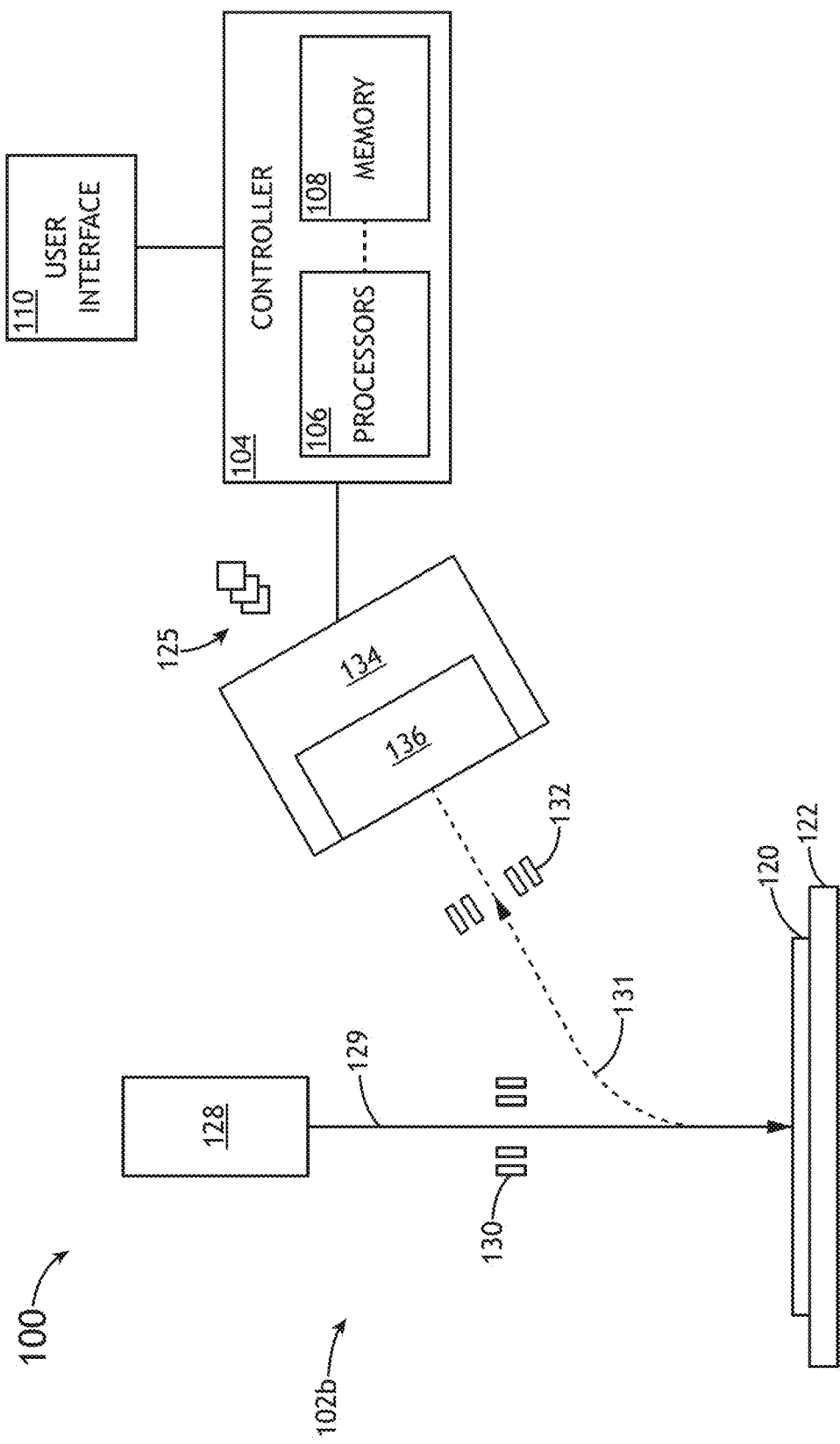
FIG. 2B illustrates the optical characterization system of FIG. 1 including an electron-based inspection subsystem, in accordance with one or more embodiments of the present disclosure.

FIG. 2B illustrates a simplified schematic view of the system 100 for characterizing a sample 120, in accordance with one or more embodiments of the present disclosure. In particular, the system 100 as depicted in FIG. 2B, includes an electron-based inspection subsystem 102b such that system 100 operates as electron-based inspection system (e.g., a scanning electron microscopy (SEM) system).

In one embodiment, the electron-based inspection subsystem 102b is configured to perform one or more measurements on the sample 120. In this regard, the electron-based inspection subsystem 102b may be configured to acquire one or more images of the sample 120. The electron-based inspection subsystem 102b may include, but is not limited to, an electron beam source 128, one or more electron-optical elements 130, one or more electron-optical elements 132, and an electron detector assembly 134 including one or more electron sensors 136.

In one embodiment, the electron beam source 128 is configured to direct one or more electron beams 129 to the sample 120. The electron beam source 128 may form an electron-optical column. In another embodiment, electron beam source 128 includes one or more additional and/or alternative electron-optical elements 130 configured to focus and/or direct the one or more electron beams 129 to the surface of the sample 120. In another embodiment, electron-based inspection subsystem 102b includes one or more electron-optical elements 132 configured to collect secondary and/or backscattered electrons 131 emanated from the surface of the sample 120 in response to the one or more electron beams 129. It is noted herein that the one or more electron-optical elements 130 and the one or more electron-optical elements 132 may include any electron-optical elements configured to direct, focus, and/or collect electrons including, but not limited to, one or more deflectors, one or more electron-optical lenses, one or more condenser lenses (e.g., magnetic condenser lenses), one or more objective lenses (e.g., magnetic condenser lenses), and the like.

It is noted that the electron optical assembly of the electron-based inspection subsystem 102b is not limited to the electron-optical elements depicted in FIG. 2B, which are provided merely for illustrative purposes. It is further noted that the system 100 may include any number and type of electron-optical elements necessary to direct/focus the one or more electron beams 129 onto the sample 120 and, in response, collect and image the emanated secondary and/or backscattered electrons 131 onto the electron detector assembly 134.

For example, the system 100 may include one or more electron beam scanning elements (not shown). For instance, the one or more electron beam scanning elements may include, but are not limited to, one or more electromagnetic scanning coils or electrostatic deflectors suitable for controlling a position of the one or more electron beams 129 relative to the surface of the sample 120. Further, the one or more scanning elements may be utilized to scan the one or more electron beams 129 across the sample 120 in a selected pattern.

In another embodiment, secondary and/or backscattered electrons 131 are directed to one or more sensors 136 of the electron detector assembly 134. The electron detector assembly 134 of the electron-based inspection subsystem 102 may include any electron detector assembly known in the art suitable for detecting backscattered and/or secondary electrons 131 emanating from the surface of the sample 120. In one embodiment, the electron detector assembly 134 includes an electron detector array. In this regard, the electron detector assembly 134 may include an array of electron-detecting portions. Further, each electron-detecting portion of the detector array of the electron detector assembly 134 may be positioned to detect an electron signal from sample 120 associated with one of the incident electron beams 129. The electron detector assembly 134 may include any type of electron detector known in the art. For example, the electron detector assembly 134 may include a microchannel plate (MCP), a PIN or p-n junction detector array, such as, but not limited to, a diode array or avalanche photo diodes (APDs). By way of another example, the electron detector assembly 134 may include a high-speed scintillator or a photomultiplier tube (PMT) detector.

While FIG. 2B illustrates the electron-based inspection subsystem 102b as including an electron detector assembly 134 comprising only a secondary electron detector assembly, this is not to be regarded as a limitation of the present disclosure. In this regard, it is noted that the electron detector assembly 134 may include, but is not limited to, a secondary electron detector, a backscattered electron detector, and/or a primary electron detector (e.g., an in-column electron detector). In another embodiment, electron-based inspection subsystem 102 may include a plurality of electron detector assemblies 134. For example, system 100 may include a secondary electron detector assembly, a backscattered electron detector assembly, and an in-column electron detector assembly.

In another embodiment, as described previously herein, the system 100 includes a user interface 110 communicatively coupled to the controller 104. In another embodiment, the user interface 110 includes a user input device and a display. The user input device of the user interface 110 may be configured to receive one or more input commands from a user, the one or more input commands configured to input data into system 100 and/or adjust one or more characteristics of system 100. In another embodiment, the display of the user interface 110 may be configured to display data of system 100 to a user.

In one embodiment, the one or more processors 106 may be communicatively coupled to memory 108, wherein the one or more processors 106 are configured to execute a set of program instructions stored on memory 108a. The set of program instructions may be configured to cause the one or more processors 106 to perform various functions and steps of the present disclosure.

The controller 104 may be communicatively coupled to the inspection subsystem 102a or 102b. The controller 104 may be configured to receive the image data 125 from the inspection subsystem 102a or 102b and detect one or more defects on the sample 120 using the image data 125.

It is noted herein that the one or more components of system 100 may be communicatively coupled to the various other components of system 100 in any manner known in the art. For example, the one or more processors 106a may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 104 may be communicatively coupled to one or more components of the inspection subsystem 102 via any wireline or wireless connection known in the art.

In one embodiment, the one or more processors 106 may include any one or more processing elements known in the art. In this sense, the one or more processors 106 may include any microprocessor-type device configured to execute algorithms and/or instructions. In one embodiment, the one or more processors 106 may be a component of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems (for example, in a cloud-computing system). Furthermore, it should be recognized that the steps described throughout the present disclosure may be carried out on any one or more of the one or more processors 106. In general, the term "processor" may be broadly defined to encompass any device having one or more processing elements, which execute program instructions from memory 108. Moreover, different subsystems of the system 100 (e.g., illumination source 112, electron beam source 128, detector assembly 126, electron detector assembly 134, controller 104, user interface 110, and the like) may include processor or logic elements suitable for carrying out at least a portion of the steps described throughout the present disclosure. Therefore, the above description should not be interpreted as a limitation on the present disclosure but merely an illustration.

The memory 108 may include any storage medium known in the art suitable for storing program instructions executable by the associated one or more processors 106 and the data received from the inspection subsystem 102. For example, the memory 108 may include a non-transitory memory medium. For instance, the memory 108 may include, but is not limited to, a read-only memory (ROM), a random-access memory (RAM), a magnetic or optical memory device (e.g., disk), a magnetic tape, a solid-state drive and the like. It is further noted that the memory 108 may be housed in a common controller housing with the one or more processors 106, respectively. In an alternative embodiment, the memory 108 may be located remotely with respect to the physical location of the processor 106 and the controller 104.

In one embodiment, a user interface 110 is communicatively coupled to the controller 104. In one embodiment, the user interface 110 may include, but is not limited to, one or more desktops, tablets, smartphones, smart watches, or the like. In another embodiment, the user interface 110 includes a display used to display data of the system 100 to a user. The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110 (e.g., a mouse and keyboard).

Figure 3:
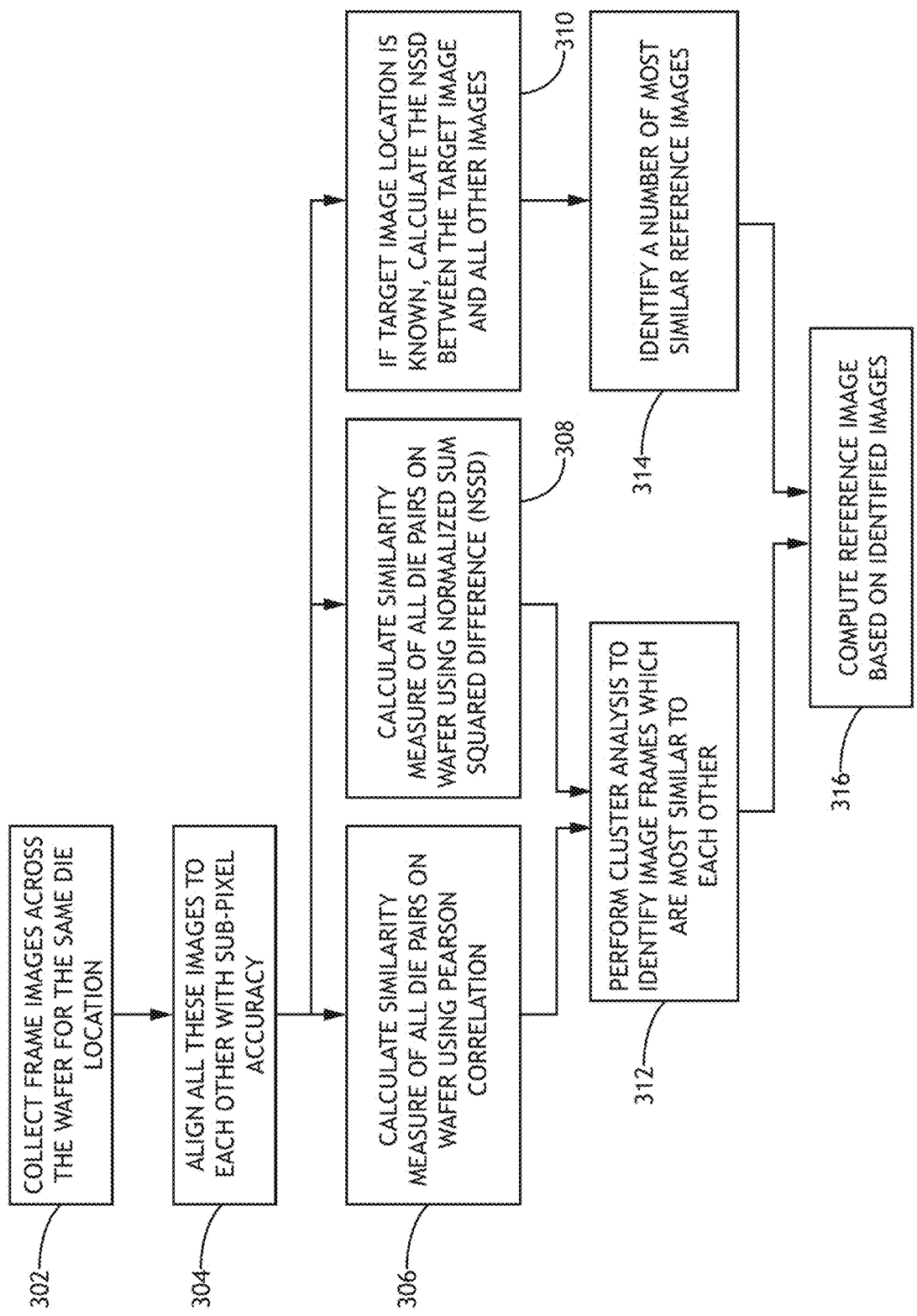
FIG. 3 is a flowchart illustrating a method of generating a reference image, in accordance with one or more embodiments of the present disclosure.

FIG. 3 is a flowchart illustrating various methods of generating a reference image, in accordance with one or more embodiments of the present disclosure.

At step 302, image data (e.g., image data 125) may be transmitted to a controller (e.g., e.g., controller 104) from an inspection subsystem (e.g., inspection subsystems 102a or 102b). The image data may comprise a plurality of images (i.e., frames), where each image corresponds to a die on a wafer.

At step 304, the images may be aligned (e.g., overlaid onto the others) and corrected for die-to-die process variation with sub-pixel accuracy. In some embodiments, the images may be aligned using a coarse alignment (e.g., ≤5 pixels). In some embodiments, the images may be aligned using a fine alignment (e.g., ≤pixel) with a gain and offset correction.

At step 306 or step 308, a similarity measure between all pairs (k-combinations) of die images may be calculated. Step 306 and step 308 are alternative steps, and either step 306 or step 308 may be performed to calculate a similarity measure. A total number of k-combinations may be defined by:

$$\frac{n!}{k!(n-k)!}$$

where n is a total number of the die images, k is 2, and n and k are both integers. In one example, if there are 470 dies on a wafer, then there are C(470, 2)=110,215 possible combinations of images to be compared. It is noted herein that the similarity measure may not be limited to dies on a wafer, and may also be applied to other structures (for examples, images of partitioned areas of a photomask). It is noted that other methods may be used to quantify the similarity between variables (e.g., least square fitting), and that the disclosure is not limited to the similarity calculations described with respect to step 306 and step 308.

At step 306 in particular, a Pearson correlation calculation may be used to calculate the similarity measure. The calculation of the Pearson correlation is performed for n pixels in the image of die X and n pixels in the image of die Y for each pixel i (e.g., where the n pixels from the image of die X are aligned or overlaid with the n pixels from the image of die Y). The equation for performing the Pearson correlation is defined as follows:

$$r_{xy} = \frac{\text{cov}(X,Y)}{\sigma_x \sigma_y} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (1)$$

where cov(X,Y) is the covariance matrix of pixels in the image of die X and the image of die Y, $\sigma_x$ and $\sigma_y$ are the corresponding standard variations, $x_i$ and $y_i$ are the respective grayscale values for a pixel i in the image of die X and the image of die Y, and $\bar{x}$ and $\bar{y}$ are the respective grayscale value averages for all of the pixels in the image of die X and the image of die Y. If there are, for example, 128 by 128 pixels in each image, then i ranges from pixel 1 to pixel 16,384. In one embodiment, sub-sections of each of the images may be processed such that a similarity measure is calculated for each sub-section. The similarity measures for each sub-section may then be combined for a total similarity measure (e.g., twenty sub-sections, each 3 by 42 pixels).

At step 308 in particular, a normalized sum squared difference (NSSD) calculation may be used to calculate the similarity measure. The calculation of the NSSD is performed for M*N pixels in the image of die X and M*N pixels in the image of die Y (e.g., where the pixels from the image of die X are aligned or overlaid with the pixels from the image of die Y). The equation for performing the NSSD calculation is defined as follows:

$$NSSD = \frac{1}{MN} = \sum_{i=1}^{M}\sum_{j=1}^{N}[X(i,j) - \gamma Y(i,j) - K]^2 \qquad (2)$$

where M and N are the respective numbers of pixels in each row and each column of the images, i is the pixel index for each row, j is the pixel index for each column, $X(i,j)$ is the image of die X (e.g., a matrix of grayscale values), $Y(i,j)$ is the image of die Y (e.g., a matrix of grayscale values), y is the gain between the image of die X and the image of die Y, and K is the offset between the image of die X and the image of die Y.

Figure 4A:
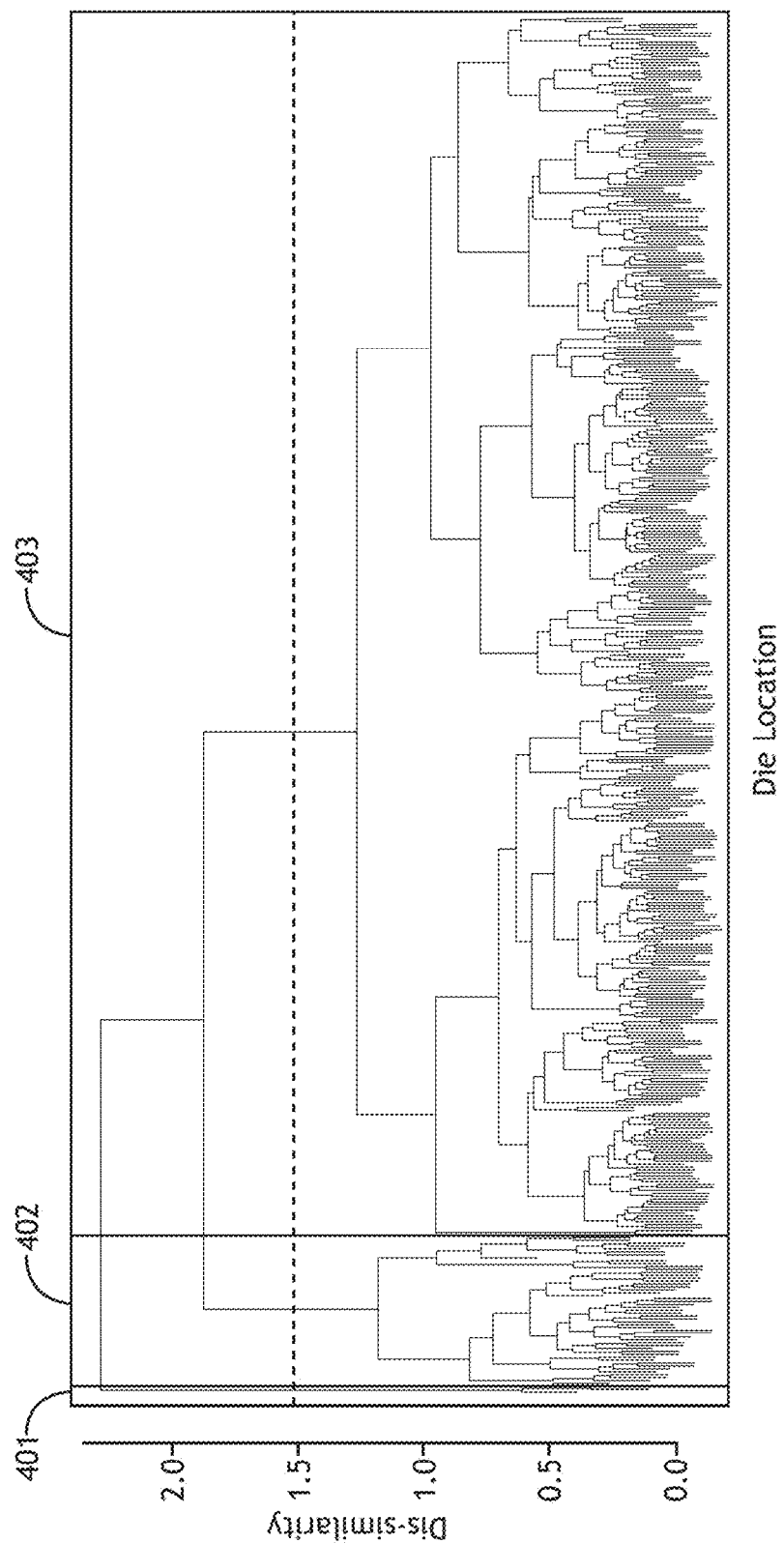
FIG. 4A is a dendrogram showing clusters of similar wafer dies, in accordance with one or more embodiments of the present disclosure.

At step 312, a cluster analysis may be performed to partition the pairs of die images into clusters (i.e., groups), where the pairs within each cluster have a substantially similar similarity measure. As shown in FIG. 4A, the cluster analysis may employ a dendrogram that plots dissimilarity value on the vertical axis and location for each die on the wafer on the horizontal axis. The cluster analysis may be performed using hierarchical clustering, k-means clustering (where k is the number of clusters which is not limited to any particular value), or any other cluster analysis method. The disclosure is not limited to any particular hierarchical clustering, any other types of hierarchical clustering may be employed (e.g., average linkage, single linkage, complete linkage, or centroid linkage).

When using k-means clustering, clusters are isolated based on their centroid locations by inputting a user defined number of clusters. On the other hand, hierarchical clustering takes n observations as an input and calculates C(n,2) pairwise dissimilarity values of all possible combinations of such observations. The C(n,2) correlation coefficients are summarized in a correlation matrix from which the correlation distance (i.e., dissimilarity) matrix (1-$r_{xy}$) is derived. In one example, each observation comprises the grayscale level values of an image having a size of 512 by 512 pixels.

As shown in the dendrogram of FIG. 4A, in one example, three clusters 401, 402 and 403 may be partitioned. The dendrogram plots dissimilarity score on the vertical axis, and die location on the horizontal axis. It is noted herein that the dendrogram may be partitioned into any number of clusters (e.g., two or more clusters), and that the three clusters 401, 402 and 403 shown in FIG. 4A are only one example. The clusters may be partitioned based on a user or pre-defined partitioning setting, or algorithmically. In the dendrogram of FIG. 4A, all of the leaves have a dissimilarity value below a threshold dissimilarity value of 1.5. The threshold dissimilarity value may be pre-selected, user-selected based on the data, or algorithmically determined.

All pairwise inter-cluster dissimilarities among the clusters are examined and the pair of clusters that are least dissimilar are identified and fused. The dissimilarity between these two clusters indicates the height in the dendrogram at which the fusion may be placed. In order to calculate the dissimilarity between groups of clusters, the concept of linkage is employed. The possible linkages may include complete linkage, single linkage, average linkage, and centroid linkage which respectively represent maximal, minimal, mean, and centroid inter-cluster dissimilarities.

Figure 4B:
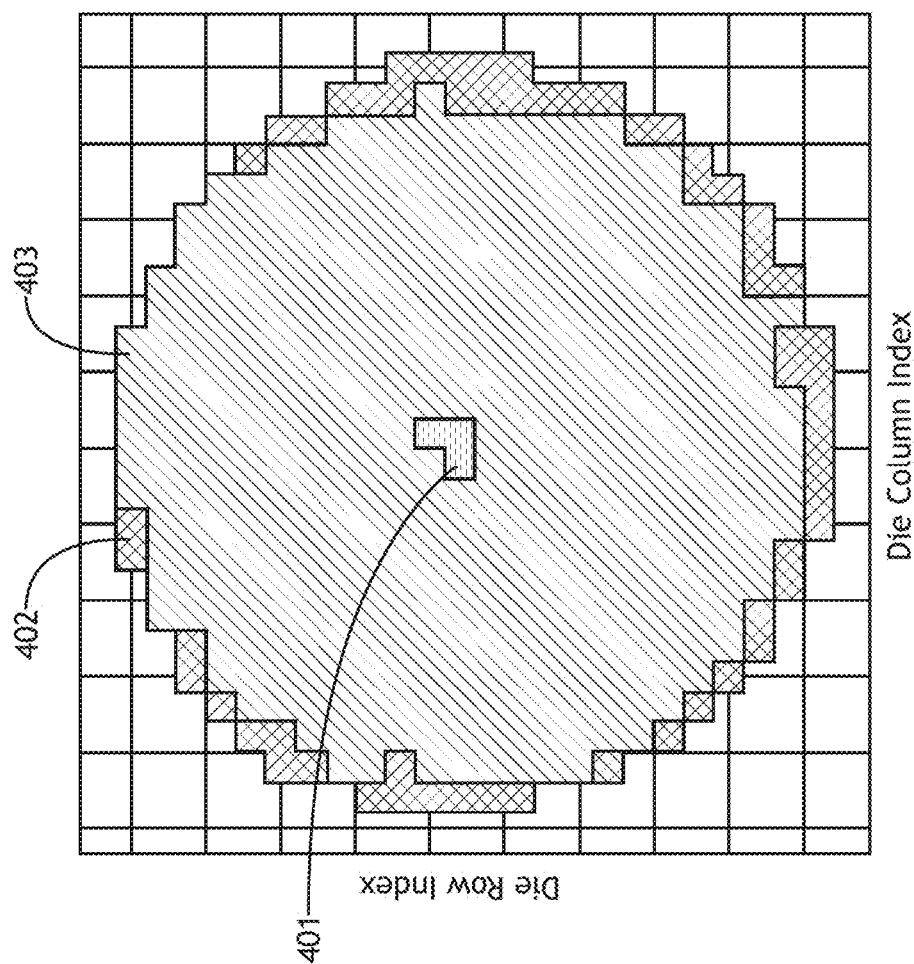
FIG. 4B is a wafer map showing the clusters identified in the dendrogram of FIG. 4A, in accordance with one or more embodiments of the present disclosure.

As shown in FIG. 4B, a wafer map may be constructed where each of the entries in the dendrogram corresponds to a certain die location on the wafer. The groupings shown in the wafer map of in FIG. 4B may be constructed by applying hierarchical clustering with average linkage to the dendrogram of FIG. 4A. For example, the cluster 401 corresponds to an area at the center of the wafer, the cluster 402 corresponds to an inner area of the wafer, and the cluster 403 corresponds to an area at the edge of the wafer. Images of dies within each cluster (e.g., cluster 401) may be compared to each other to provide a reference image with a relatively low amount of noise (e.g., from the radial dependency of the wafer processing). In contrast, comparing an image from one cluster (e.g., cluster 401) to an image from another cluster (e.g., cluster 402 and 403) may provide a reference image with a relatively high amount of noise. Thus, it may be desirable to only compare images within the same cluster.

Branches at the bottom of the dendrogram of FIG. 4A may be selected to generate reference images with a relatively low amount of noise (since the dissimilarity at the bottom of the dendrogram is lowest). Each leaf represents one die which is characterized by one row and one column value. At least three leaves may be selected together to generate a reference image. In some embodiments, all of the leaves (i.e., die images) in one cluster (e.g., cluster 401) may be selected to generate a reference image. In some embodiments, a subset of the leaves in one cluster (e.g., leaves having relatively similar noise profiles) may be selected to generate a reference image.

Figure 5:
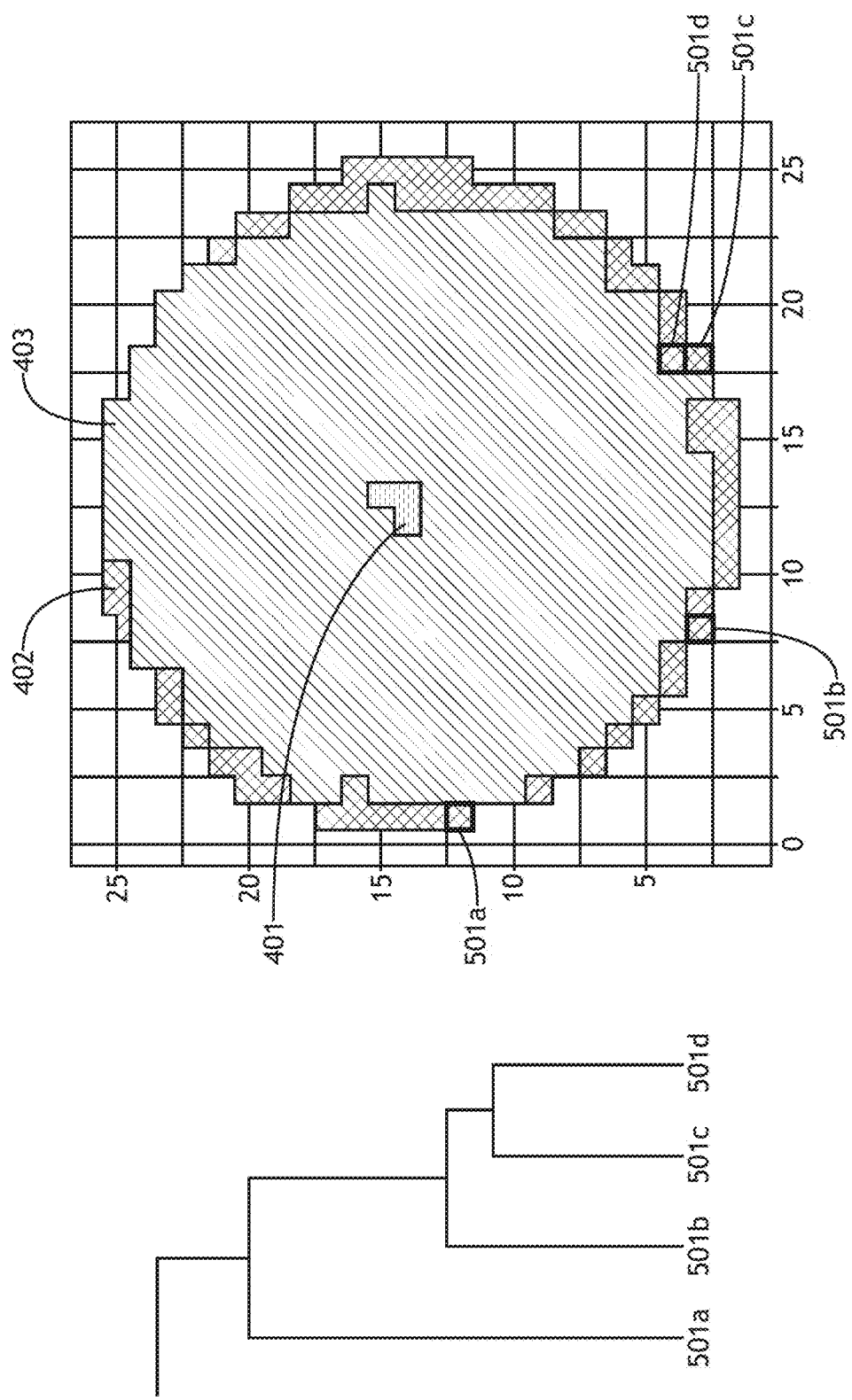
FIG. 5 is the wafer map of FIG. 4B showing markings identifying the dies to be used as reference images, in accordance with one or more embodiments of the present disclosure.

FIG. 5 shows a wafer map where identified dies correspond to leaves of the dendrogram. The dies 501*a-d* (all of which are in the same cluster 403) may be selected for the reference image calculation, since the dies 501*a-d* are relatively similar to each other in terms of their noise characteristics and may thus reduce the noise of the reference image (see, e.g., the dendrogram branches shown in FIG. 5, where the leaves representing the dies 501*a-d* have relatively similar dissimilarity scores).

Step 310 is an alternative step to either step 306 or step 308. At step 310, when test image (i.e., a target image) is selected, then the NSSD may be calculated between only the test image and all of the other images (e.g., instead of between all possible combinations of die images). For example, if there are 470 dies, there are 469 comparisons between the target image and all of the other images. At step 314, after the NSSD is calculated between the target image and all of the other images, a number of substantially similar reference images (e.g., ≥2) may be identified between the target image and all of the other images (e.g., having a dissimilarity value below a threshold value). The reference images may be identified based on the images with a minimal SSD when compared to the test image.

At step 316, a reference image may be computed based on the images identified in either step 312 or step 314. The reference image may be calculated using, for example, a linear combination of reference images (e.g., MCAT), or by averaging the images. The reference image may be compared to a candidate image (i.e., test image) for a die to be tested. When the reference image is subtracted from the test image, the difference may indicate a problematic structure (or an overlay misalignment), and a corrective action may be performed (e.g., by adjusting the design or processing of a wafer) for the location of the tested die. The processes to be corrected may be related to, for example, thin film deposition, etching, polishing, etc.

Figure 6:
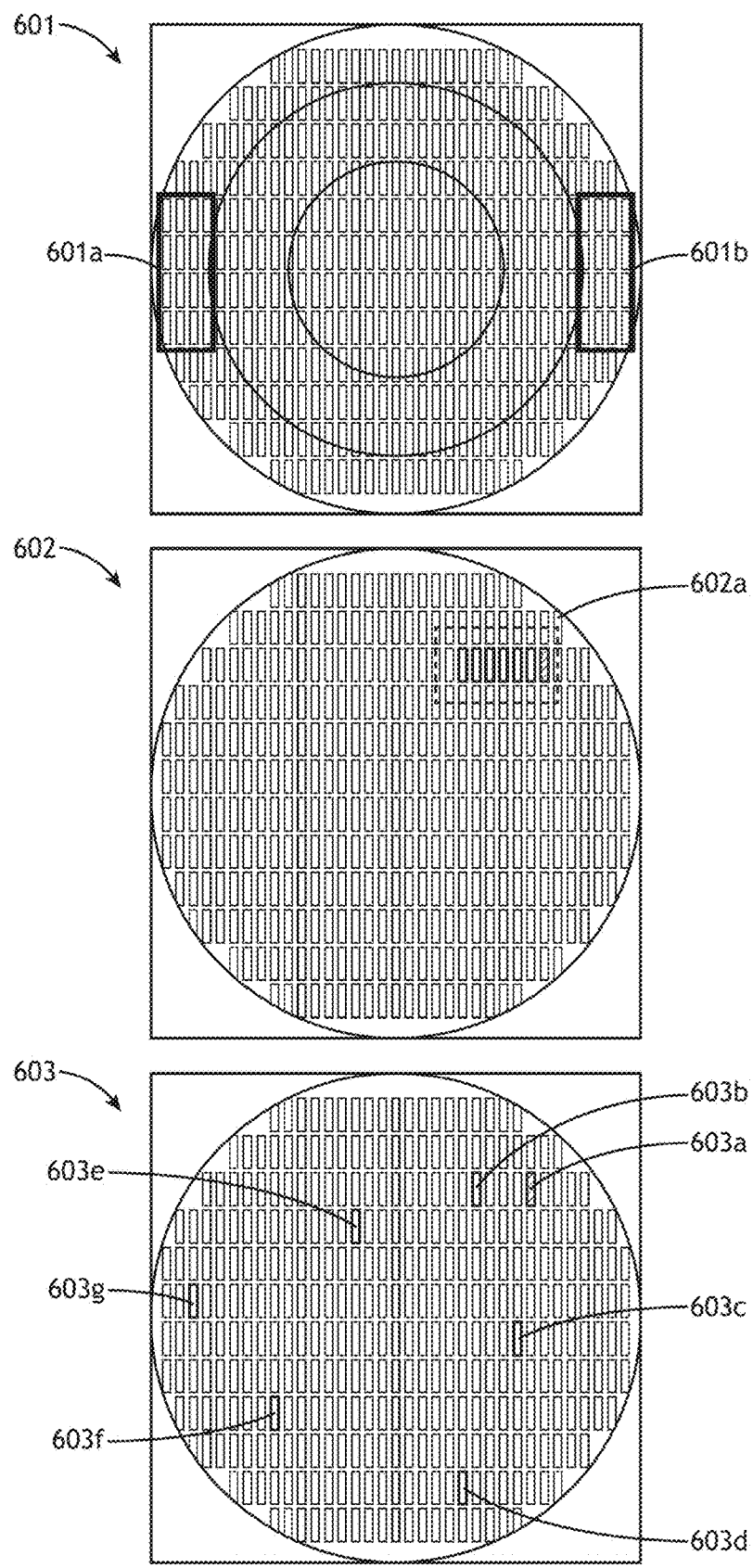
FIG. 6 shows wafer maps illustrating various schemes for reference image generation, in accordance with one or more embodiments of the present disclosure.

FIG. 6 shows wafer maps 601-603 illustrating various schemes for die image selection and reference image generation. The wafer maps 601 and 602 illustrate conventional schemes where the die images are selected from pre-defined areas of the wafer (e.g., not based on similarity scores). In contrast, the wafer map 603 illustrates a scheme where the die images are selected based on similar noise profiles, as described with respect to FIGS. 3-5.

In a reference bank scheme 601, a radial symmetry is assumed for the wafer. The areas 601a and 601b have the same radius from the center of the wafer. An image of a die to be tested (i.e., a test image) is selected from either area 601a or 601b. Likewise, images of dies in the areas 601a and/or 601b are selected for reference image generation, since the noise profiles of the selected die images are assumed to be similar to the noise profile of the test image. The reference bank scheme is further described in U.S. Pat. No. 10,151,706, which is incorporated by reference herein in its entirety. Although the images selected from the areas 601a and/or 601b may have a similar noise profile to a test image from the areas 601a or 601b, a further improvement in noise profile similarity is desirable.

In a process-of-record (POR) scheme 602, images of adjacent dies in the row 602a are selected for reference image generation. The hatched die (e.g., on the right side of the row 602a) represents a test die. The bolded dies represent dies selected for reference image generation. Images of dies that are located next to each other may not necessarily have similar noise profiles, and thus, noise from the radial dependency of the processing may prevent the accurate detection of differences between the dies. A further improvement in the noise profile similarity between the test die image and the selected die images is desirable.

In a flexible job scheme 603, a combination of die images having similar noise profiles may be selected for the reference image generation. The die 603a may represent a test die, and the dies 603b-g may represent dies selected for reference image generation. The images of the dies 603b-g may have similar noise profiles to the image of the test die 603a. Thus, the images of the dies 603b-g may be selected regardless of their physical location relative to the test die (e.g., using a Pearson correlation calculation or an NSSD calculation and clustering as described with respect to FIGS. 3-5).

Figure 7A:
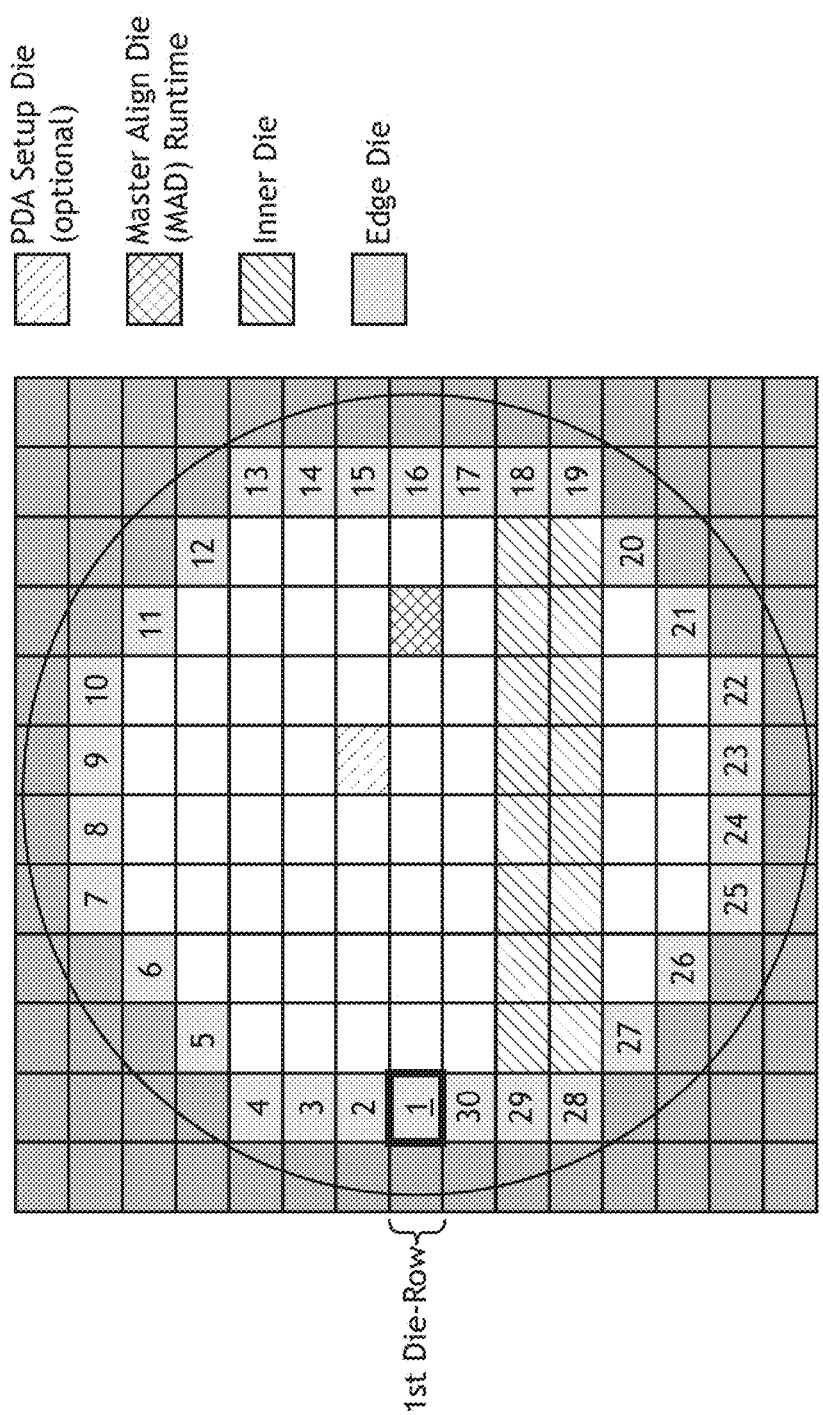
FIG. 7A is a wafer map showing the selection of frames for reference image generation, in accordance with one or more embodiments of the present disclosure.
Figure 7B:
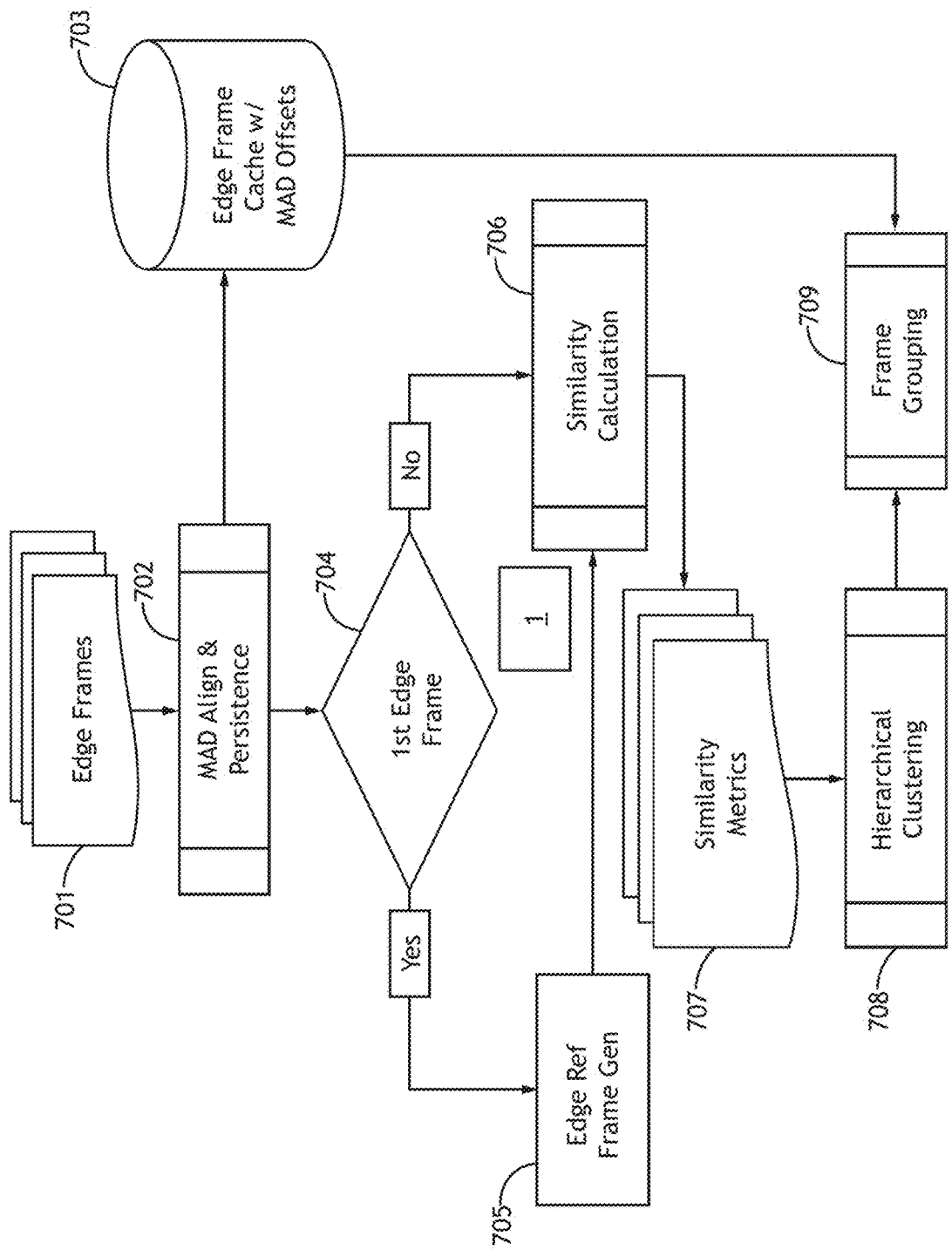
FIG. 7B is a flowchart illustrating the selection of frames for reference image generation, in accordance with one or more embodiments of the present disclosure.

Referring now to FIGS. 7A-7B, techniques for determining a reference image based on noise profiles are described in accordance with one or more embodiments of the present disclosure. Dies may be grouped based on their noise profiles into two groups: (1) dies where the noise in a die-to-die comparison may be compensated during run-time scanning (e.g., due to a small difference between the test die and adjacent dies), and (2) dies having a noise characteristic that is significantly different from adjacent dies.

When generating a reference image for the latter group of dies, it may be desirable to select dies across the entire wafers that have similar noise profiles. In particular, the latter group may comprise edge dies, which may have a significantly different noise profile from inner dies (due to radial dependency noise). In some embodiments, may be advantageous to compare the edge die images to a common reference edge die image.

FIG. 7A is a wafer map showing the selection of frames for reference image generation. A group of edge dies 1-30 may be utilized for reference image generation. In some embodiments, one or two inner dies may be grouped with the edge dies 1-30. A master align die (MAD) may be utilized such that all other die images are aligned to the MAD. Optionally, a pixel-to-design alignment (PDA) die may be utilized, in addition to the MAD, to ensure that the processed dies are aligned to a design image.

FIG. 7B is a flowchart illustrating the selection of edge die images for reference image generation using the wafer map of FIG. 7A.

At step 701, image data (e.g., image data 125) may be transmitted to a controller (e.g., e.g., controller 104) from an inspection subsystem (e.g., inspection subsystems 102a or 102b). The image data may comprise a plurality of images (i.e., frames), where each image corresponds to a die on a wafer. In particular, the images of edge dies and two neighboring inner dies may be collected by the controller.

At step 702, the images may be aligned (e.g., overlaid onto the others) and corrected for die-to-die process variation with sub-pixel accuracy. A master align die (MAD) may be utilized such that all other die images are aligned to the MAD. Optionally, a pixel-to-design alignment (PDA) die may be utilized, in addition to the MAD, to ensure that the processed dies are aligned to a design image. In some embodiments, the images may be aligned using a coarse alignment (e.g., ≤5 pixels). In some embodiments, the images may be aligned using a fine alignment (e.g., ≤1 pixel) with a gain and offset correction. It is noted herein that the disclosure is not limited to any particular alignment technique, and other alignment techniques not explicitly disclosed may be utilized.

At step 703, the images may be cached such that the images may be retrieved quickly in future steps. In particular, the images of edge dies and two neighboring inner dies may be cached. Additionally, offsets of the position of edge dies relative to the MAD die may be generated.

At step 704, a first edge die image may be selected for reference image generation. At step 705, a reference edge die image may be generated from the first edge die image. At step 706, to generate noise profiles, edge die images may be compared to the reference edge die image (i.e., all the other edge die images not selected to generate the reference edge die image). For example, if the image of edge die 1 is selected as the reference edge die image, the image of edge die 1 may be compared to the images of edge dies 2-30. This comparison may be performed, for example, using the NSSD calculation as described with respect to step 308 of FIG. 3. At step 707, a similarity measure (i.e., dissimilarity values) may be generated based on the comparison. A dendrogram may be constructed plotting dissimilarity values on the vertical axis, and die location on the horizontal axis (e.g., substantially similar to the dendrogram described with respect to FIG. 4A).

At step 708, a cluster analysis may be performed on the edge die images. This cluster analysis may be performed, for example, using hierarchical clustering as described with respect to step 312 of FIG. 3. The cluster analysis may employ a dendrogram plotting dissimilarity on the vertical axis and die location on the horizontal axis (e.g., substantially similar to the dendrogram shown in FIG. 4A). At step 709, the edge die images may be partitioned into multiple partitions based on their noise profiles. Images within each partition may be used to generate reference images (for example, by using the MCAT algorithm). A candidate image may be subtracted from a reference image to produce a difference image.

Several techniques may be utilized to reduce nuisances (e.g., undesirable or misleading noise) when generating a reference image (e.g., an MCAT reference image) for a candidate image. Each candidate image may have a corresponding MCAT reference image (e.g., generated in step 709 of the flow chart of FIG. 7B). The subtraction of a candidate image from an MCAT reference image may produce a difference image. It is noted herein that the reference image may be any type of reference image described in the present disclosure, and that the MCAT reference image is described as an example.

In a first nuisance rejection technique, an MCAT difference image may be calculated by subtracting a candidate image from an MCAT reference image. A first minimum difference ("min-diff") image may be calculated between a candidate image and the single reference edge die image (e.g., described with respect to step 705). Then, a second minimum difference image may be calculated between the first minimum difference image and the MCAT difference image. Defects may then be detected based on the second minimum difference image.

In a second nuisance rejection technique, an MCAT difference image may be calculated by subtracting a candidate image from an MCAT reference image. A second difference image may be calculated between the MCAT difference image and the single reference edge die image (e.g., described with respect to step 705). Defects may be detected based on the second difference image, and a signal-to-noise (SNR) may be computed for pixels associated with defects. If the SNR is large for one or more of the pixels, then the pixels may be associated with a nuisance (not a real defect).

Minimum difference image calculations may be advantageous in that the locations of actual defects (or misalignments between layers) in the die of the candidate image and the die of the MCAT reference image have similar grayscale values, while locations of random process noise have widely varying grayscale values. Thus, the grayscale values of the actual defects are largely unaffected, while the random noise is significantly reduced.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An optical characterization system, comprising:
a controller configured to be communicatively coupled with one or more detectors configured to receive illumination from a sample and generate image data, including one or more processors configured to execute program instructions causing the one or more processors to:
receive the image data, wherein the image data comprises images of dies on the sample;
calculate dissimilarity values for all combinations of the images;
perform a cluster analysis to partition the combinations of the images into two or more clusters;
generate a reference image for a cluster of the two or more clusters using two or more of the combinations of the images in the cluster; and
detect one or more defects on the sample by comparing a test image in the cluster to the reference image for the cluster.

2. The system of claim 1, wherein the one or more processors are configured to execute program instructions causing the one or more processors to:
generate a difference image by subtracting the test image from the reference image.

3. The system of claim 1, wherein a total number of the combinations is defined by:

$$\frac{n!}{k!(n-k)!}$$

wherein n is a total number of the images and k is 2.

4. The system of claim 1, wherein the sample comprises a semiconductor wafer, a reticle, or a photomask.

5. The system of claim 1, wherein the one or more processors are configured to execute program instructions causing the one or more processors to align each of the images to others of the images.

6. The system of claim 1, wherein the dissimilarity values are calculated using a Pearson correlation.

7. The system of claim 1, wherein the dissimilarity values are calculated using a normalized sum squared difference (NSSD) calculation.

8. The system of claim 1, wherein the cluster analysis comprises hierarchical clustering.

9. The system of claim 8, wherein the hierarchical clustering comprises at least one of:
average linkage, single linkage, complete linkage, or centroid linkage.

10. The system of claim 1, wherein the cluster analysis comprises k-means clustering.

11. An optical characterization method, comprising:
receiving illumination from a sample using one or more detectors;
generating image data;
receiving the image data, wherein the image data comprises images of dies on the sample;
calculating dissimilarity values for all combinations of the images;
performing a cluster analysis to partition the combinations of the images into two or more clusters;
generating a reference image for a cluster of the two or more clusters using two or more of the combinations of the images in the cluster; and
detecting one or more defects on the sample by comparing a test image in the cluster to the reference image for the cluster.

12. The method of claim 11, further comprising:
generating a difference image by subtracting the test image from the reference image.

13. The method of claim 11, wherein a total number of the combinations is defined by:

$$\frac{n!}{k!(n-k)!}$$

wherein n is a total number of the images and k is 2.

14. The method of claim 11, wherein the sample comprises a semiconductor wafer, a reticle, or a photomask.

15. The method of claim 11, comprising aligning each of the images to others of the images.

16. The method of claim 11, wherein the dissimilarity values are calculated using a Pearson correlation.

17. The method of claim 11, wherein the dissimilarity values are calculated using normalized sum squared difference (NSSD) calculation.

18. The method of claim 11, wherein the cluster analysis comprises hierarchical clustering.

19. The method of claim 18, wherein the hierarchical clustering comprises at least one of:
average linkage, single linkage, complete linkage, or centroid linkage.

20. The method of claim 11, wherein the cluster analysis comprises k-means clustering.

21. An optical characterization system, comprising:
a controller configured to be communicatively coupled with one or more detectors configured to receive illumination from a sample and generate image data, including one or more processors configured to execute program instructions causing the one or more processors to:
receive the image data, wherein the image data comprises images of dies on the sample;
identify edge die images from the images of dies on the sample;
generate a reference edge die image using a first edge die image from the edge die images;
calculate dissimilarity values for all combinations of the reference edge die image and others of the edge die images;
perform a cluster analysis to partition the combinations into two or more clusters;
generate a reference image for a cluster of the two or more clusters using two or more of the combinations of the edge die images in the cluster; and
detect one or more defects on the sample by comparing a test image in the cluster to the reference image for the cluster.

22. The system of claim 21, wherein the one or more processors are configured to execute program instructions causing the one or more processors to:
generate a difference image by subtracting the test image from the reference image.

23. The system of claim 21, wherein the dissimilarity values are calculated using a Pearson correlation.

24. The system of claim 21, wherein the dissimilarity values are calculated using normalized sum squared difference (NSSD) calculation.

25. The system of claim 21, wherein the cluster analysis comprises hierarchical clustering.

26. An optical characterization system, comprising:
a controller configured to be communicatively coupled with one or more detectors configured to receive illumination from a sample and generate image data, including one or more processors configured to execute program instructions causing the one or more processors to:
receive the image data, wherein the image data comprises images of dies on the sample;
identify a test image;
calculate dissimilarity values for all combinations of the test image and others of the images;
identify two or more of the combinations having a dissimilarity value below a threshold dissimilarity value;
generate a reference image using the two or more of the combinations; and
detect one or more defects on the sample by comparing the reference image to the test image.

27. The system of claim 26, wherein the dissimilarity values are calculated using normalized sum squared difference (NSSD) calculation.

* * * * *